United States Patent [19]

Boyce et al.

[11] Patent Number: 5,591,477
[45] Date of Patent: Jan. 7, 1997

[54] METHOD OF PRODUCING A REDUCED FAT PEANUT BUTTER WITHOUT NON-PEANUT SUPPLEMENTS AND PRODUCT THEREFROM

[75] Inventors: Ricky C. Boyce; Mona C. Jones; Wilbur A. Parker, all of Edenton, N.C.; Edward J. Festa, Atlanta, Ga.

[73] Assignee: Seabrook Enterprises, Inc., Atlanta, Ga.

[21] Appl. No.: 434,002

[22] Filed: May 3, 1995

Related U.S. Application Data

[63] Continuation-in-part of Ser. No. 266,936, Jun. 27, 1994.
[51] Int. Cl.⁶ .................................................. A23L 1/38
[52] U.S. Cl. .................... 426/633; 426/516; 426/518; 426/519; 426/632; 426/654
[58] Field of Search ................................ 426/632, 633, 426/654, 516, 518, 519

[56] References Cited

U.S. PATENT DOCUMENTS

| | | | |
|---|---|---|---|
| 617,266 | 1/1899 | Watson | 426/632 |
| 3,294,549 | 12/1966 | Vix et al. | 99/126 |
| 3,901,983 | 8/1975 | Matsunagce | 426/632 |
| 4,190,577 | 2/1980 | Steele et al. | 260/123.5 |
| 4,650,857 | 3/1987 | May | 530/377 |
| 4,814,195 | 3/1989 | Yokoyama et al. | 426/633 |
| 4,828,868 | 5/1989 | Lasdon et al. | 426/633 |
| 4,839,193 | 6/1989 | Mange et al. | 426/633 |
| 5,079,027 | 1/1992 | Wong et al. | 426/633 |
| 5,164,217 | 11/1992 | Wong et al. | 426/632 |
| 5,230,919 | 7/1993 | Walling et al. | 426/633 |
| 5,302,409 | 4/1994 | Franklin | 426/633 |
| 5,366,754 | 11/1994 | Rudan et al. | 426/633 |
| 5,436,023 | 7/1995 | Avera | 426/633 |

FOREIGN PATENT DOCUMENTS

| | | | |
|---|---|---|---|
| 1184063 | 3/1985 | Canada | A23L 1/38 |
| 2007961B | 5/1979 | United Kingdom | A23L 1/38 |

OTHER PUBLICATIONS

"Hander Instruction Manual for Hander Oil Expeller," *Hander Oil Machinery Corp.*, pp. 1–24 (date unknown).
*The Anderson Grain Expander*, Bulletin GE–466, 4 unnumbered pages (date unknown).
"'Hander' Oil Expellers," *Hander Oil Machinery Corporation*, Type EX 100, 10 HP, six unnumbered pages (date unknown).
"'Hander' Oil Expeller Type EX 100," *Hander Oil Machinery Corporation*, two page brochure (date unknown).
"'Hander' Mechanical Oil Extraction," *Hander Oil Machinery Corporation*, two unnumbered pages, instructions and nomenclature (date unknown).
"Increase Your Income with a Hander Oil Mill," *Hander Oil Machinery Corporation*, four pages (as copied) (date unknown).
"The Most Versitle Expander for Processing High and Low Oil Bearing Seeds Ahead of Solvent Extraction," *Anderson International Corp.*, one page brochure (date unknown).
"Anderson Twin Motor Super Duo Expeller Presses," *Anderson International*, one page (date unknown).

*Primary Examiner*—Helen Pratt
*Attorney, Agent, or Firm*—Needle & Rosenberg, P.C.

[57] ABSTRACT

The present invention encompasses a process of producing a reduced fat peanut butter without non-peanut supplements and the products therefrom. The method entails making a peanut flour using a defatting process and then mixing this flour with ground roasted peanuts and a selected amount of peanut oil to produce a peanut paste. The method then entails adding sweetener, dextrin, salt, flavorants, and/or fiber to the peanut paste, blending the resultant peanut product, and then remilling the peanut product to produce a reduced fat peanut butter. This peanut butter can be finished using conventional methods. The resultant peanut butter can have a 30 percent fat reduction compared to conventional peanut butter.

29 Claims, 4 Drawing Sheets

FIG 3

METHOD OF PRODUCING A REDUCED FAT PEANUT BUTTER WITHOUT NON-PEANUT SUPPLEMENTS AND PRODUCT THEREFROM

This is a continuation-in-part of co-pending application U.S. Ser. No. 08/266,936 filed Jun. 27, 1994.

BACKGROUND OF THE INVENTION

1. Field of the Invention

This invention relates to the process for making a nutritionally superior peanut butter and the resultant peanut butter that has 25–30% less fat and, contains all the natural nutrients of conventional peanut butter—including a higher protein content and all of the natural vitamins and minerals—but contributed by only non-fat peanut solids. This invention may also replace part of the carbohydrate ingredients with selected fibers, both soluble and insoluble, to increase the fiber content of the reduced fat peanut butter.

2. Background Art

Peanut butter is by far the most important product made from peanuts in the United States. It is a favorite food of both adults and children, especially young children. The attributes of peanut butter include its convenience, flavor, and stability. It is also nutritious and an excellent source of protein.

Regulations govern the ingredients in a product labeled as "peanut butter." The U.S. Standard of Identity for peanut butter, 21 CFR 164,150, requires a formulation having a minimum of 90 percent peanut ingredients with optional ingredients such as salt, sugars, and emulsifiers limited to 10 percent by weight. The Standard also limits fat content to 55% and prohibits the use of any chemical preservatives, artificial sweeteners, vitamins, minerals, flavors, or colors.

The per capita consumption of peanut butter, however, has declined recently as health-conscious consumers have become more concerned about the dietary effects of fat. Peanuts and peanut butter normally contain about 50% fat by weight. Since the U.S. Standard of Identity requires a minimum of 90 percent peanut ingredients, obviously conventional peanut butter has a high percentage of fat. Accordingly, the appeal of peanut butter has diminished as consumers have become increasingly wary of foods that supply a high percentage of the caloric value from fat.

The industry has made attempts to reduce the fat content of peanut butter, such as by the addition of carbohydrates, making either peanut spreads or variations of peanut butter, or modifying the oil phase by the addition of medium chain triglycerides. Some of the resulting products fail to satisfy the U.S. Standard of Identity and cannot be labeled as "peanut butter." Instead, these products are called peanut spreads or imitation peanut butters.

Yokoyama, et al., U.S. Pat. No. 4,814,195, for example, teaches a reduced calorie peanut butter product containing from about 15 to about 40% by weight of a solid bulking agent having from 0 to about 3 calories per gram. These products do not meet peanut butter regulatory requirements because the peanut material components are at 62 percent or less. Protein and other nutritional supplements are thus necessary with these products. Furthermore, both of the products use polydextrose and microcrystalline cellulose which require special processing prior to addition into the peanut butter product.

Likewise, Lasdon, et al., U.S. Pat. No. 4,828,868, discloses the use of an unroasted, partially-defatted peanut flour that is milled in water, then cooked at a temperature below the boiling point of the water/flour mixture. The end product has a very high water content of 45–55 percent. The product is also packaged while at a temperature of about 170° F. There is only 25–50 percent peanut material in the final product. Accordingly, the peanut product is not nutritionally equivalent to peanut butter or peanut spread. This product also has the drawback of requiring refrigeration. Moreover, the processing steps are less desirable because they are non-conventional in the industry and would require specialized equipment.

Walling, et al., U.S. Pat. No. 5,230,919, titled "Composition and Process of Making Fluid, Reduced Fat Peanut Butters and Improved Whipped Peanut Butters", instructs on a reduced fat peanut butter produced using partially defatted peanut solids combined with regular peanuts under high shear mixing conditions. This defatting process is semi-continuous. It is also comparatively expensive. Additionally, the particle size of the milled flour is crucial, requiring 65–80 percent of the flour to have a particle size less than 18 microns. The process also requires substantial reintroduction of peanut oil to produce a flowable product. These processing requirements result in a high product cost. Similarly, Wong, U.S. Pat. No. 5,079,027, has the same drawbacks as Walling.

A further example of an attempt to produce a low-fat peanut butter is Franklin, U.S. Pat. No. 5,302,409, in which a reduced-fat peanut butter is made by removing oil from ground peanuts. Oil is preferably removed by centrifuging the ground peanuts until a supernatant oil layer is formed above the ground peanuts and separating the ground peanuts from the supernatant oil layer. The resulting peanut paste is then reground. Maltodextrin and modified food starch then can be added along with salt, butter flavoring, or peanut flavoring. This process is semi-continuous, thus limiting production. The product uses hydrated modified food starch which increased the moisture content creating a questionable shelf life.

SUMMARY OF THE INVENTION

The above disadvantages of the prior art are overcome by the present invention which provides a process to make a reduced-fat peanut butter and the product itself that has a nutritional content equivalent to conventional peanut butter. The present invention uses a novel approach to achieve the nutritional equivalency of regular peanut butter without having the high fat content. The process can be continuous and use conventional equipment.

The present invention uses a low fat, food grade peanut flour for use in base reduced fat peanut butter formulations. This flour aids in the peanut butter having a reduced oil content, while maintaining all comparable nutritive parameters to regular peanut butter by means of an equal nonfat peanut component, and complying with both federal regulations, e.g., 21 CFR 164.150, and reduced fat claims of standardized foods, e.g., 21 CFR 101.62.

In a preferred embodiment of the invention, a high-quality, low-oil content, essentially micro free, concentrated protein flour is made from peanuts. To make the peanut flour, a defatting process is utilized. This method preferably uses a screw process on raw peanuts to remove approximately 80 percent of the oil content to 8–10 percent final fat. The resulting defatted peanut cake which remains after the oil is removed can then be roasted, and rolled or ground into a peanut flour in a continuous flow process. Importantly, the particle size of the flour is not crucial to the subsequent process. The reduction of the peanut cake into flour can be achieved using a variety of methods and equipment. As a result, the defatting, roasting, and grinding process is comparatively inexpensive.

Roasted high protein peanut solids, or peanut flour, can then be blended with ground roasted full fat peanuts, and a small amount of peanut oil to assist in reducing the viscosity. This mixture of peanut flour, roasted peanuts, and peanut oil produces a peanut paste. Stabilizer, an optional component, can also be added at this point. This peanut paste has all of the nutritional peanut components essential to the final peanut butter product. The peanut paste preferably can have an oil content of about 40%, non-fat peanut solids of 55%, and a protein content of 33%. This paste can be entirely comprised of natural peanut components.

Using the peanut paste to make reduced fat peanut butter, the method entails adding an effective amount of sweetener, dextrin, salt, flavorants, and/or fiber with the peanut paste to produce a peanut product. The next step is blending the peanut product and then remilling the peanut product, wherein a reduced-fat peanut butter is produced.

After this, the reduced fat peanut butter can be finished by deaerating it in a vacuum kettle, then rapidly cooling the deaerated product, and then tempering the peanut butter after filling. Optionally, after cooling the peanut butter, an effective amount of nut chunks can be added to obtain reduced fat chunky peanut butter.

The resultant peanut butter has a fat content reduced by 25 percent compared to conventional products. Many variations exist, as described below, including a variation with a reduction in fat content of 30 percent.

The percent of fat reduction is based on a comparison of fat per serving of commercially-available peanut butter with the fat per serving of the present invention. Two tablespoons of standard peanut butter, which has a weight of 32 grams has been established as the typical serving size. Two tablespoons of the present reduced fat invention has 35 grams, as determined by multiple density measurements. This increased density reflects the result of fat removal.

Percent fat reduction is determined as follows:

Standard Peanut Butter @50% Fat/Oil 0.50×32 gram Serving Size=16 grams Fat/Serving Reduced Fat Peanut Butter @34% Fat/Oil 0.34×35 gram Serving Size=12 grams Fat/Serving A 4 gram fat reduction thus provides a 25% reduction of fat per serving for the reduced fat version.

It is thus an object of this invention to produce reduced fat peanut butter with all of the attributes, qualities, and components of conventional, full fat peanut butter.

It is also an object of this invention to produce a peanut butter nutritionally equivalent to its standard counterpart, e.g., equivalent protein, fiber, vitamins, and minerals, without the use of non-peanut nutritional supplements. To achieve this, the peanut solids contained in the reduced fat peanut butter are equalized with that of conventional peanut butter to achieve nutritional equivalency.

It is also an object of this invention to obtain nutritional components from peanuts and peanut products instead of supplements. No protein supplement is added during processing. No other types of nutritional supplements are necessary in the present invention for obtaining nutritional equivalency of standard peanut butter.

It is a further objective of this invention not to 0 use any non-peanut product for bulking the reduced fat peanut butter. Maltodextrin or other additives, however, can be used to replace the fat.

Another object of the present invention is to have a final reduced fat product which has a moisture content similar to the level of full fat peanut butter. This objective is achieved without the introduction of water during the process. Furthermore, little or no oil reintroduction is required during the process.

Still another objective of this invention is for the peanut butter to be shelf stable.

Yet another object of this invention is to produce reduced fat peanut butter that is price competitive. As an associated consideration, it is an objective to process the peanut butter using conventional equipment.

Another objective of the present invention is to have a complete continuous flow process. As such, the process to make peanut flour can be designed to be part of the reduced fat peanut butter making process. Alternatively, however, the flour making process may be a separate process and batch added to the other ingredients.

Other features and advantages of the invention will become apparent to those skilled in the art upon review of the following detailed description, claims, and drawings.

DETAILED DESCRIPTION OF THE INVENTION

The present invention is more particularly described in the following examples which are intended as illustrative only since numerous modifications and variations therein will be apparent to those skilled in the art.

As used in the specification and in the claims, "a" can mean one or more, depending upon the context in which it is used.

The present invention may be understood more readily by reference to the following detailed description of specific embodiments and the Examples and Figures included herein.

The present invention encompasses a method for producing a reduced fat peanut butter and the resultant peanut butter. The first step in making the reduced fat peanut butter of the present invention is making a peanut paste. The peanut paste can be used for making peanut butter discussed herein as well as other variations. Likewise, the peanut paste can be used for bakery, confectionary and dairy product applications.

The first step in the method for producing the peanut paste is selecting a first amount of uncooked peanuts at a predetermined moisture level. This first amount of peanuts is used to make a peanut flour. In a preferred method to produce peanut flour, uncooked, blanched (deskinned) peanuts are fed onto a conveyor at a continuous rate of about 454 kg per hour. Although blanched peanuts having a different moisture content can be used, it has been found that uncooked peanuts, blanched or unblanched, having a moisture content of preferably about 5–6% provide the highest quality protein cake and lowest oil content out of the expelling device. In any event, it is important that the moisture content of the peanuts be kept within the range 5–9%, and more preferably within the range 5–6%. Percentages outside of this range can result in reduced efficiency of oil extraction and improper operation of the expelling device.

This first amount of peanuts is preferably uncooked. Use of uncooked peanuts avoids protein insolubilization and chemical browning during the pressing of the peanuts in the expelling device.

In making the peanut flour to be used in the peanut paste, the next step involves conditioning the first amount of peanuts by heating them for not more than approximately two minutes so that the peanuts reach a final temperature of between approximately 71° to 99° C. In the preferred embodiment, the peanuts are flash pre-heated by immersing or dipping them in peanut oil at a temperature of between 116°–132° C. for a sufficient time, usually 2 minutes. The preferred range for the peanut temperature is between 82°–93° C., although between 71°–99° C. is acceptable. Conventional, continuous oil cookers, manufactured by Sandvik Process Systems, Heat & Control, and Pittman Mastermatic, are sufficient for this step. Alternatively, dry heat application is also possible through the use of industrial microwave driers and conventional air roasters, and also dry expanders, such as the 8" Diameter Anderson Dox Hivex Dry Expander which conditions the peanuts under pressure and heat of friction.

The conditioned peanuts are then conveyed to an expelling device which has been preheated to a temperature between 107° and 132° C. Although many types of expelling devices can be used, such as a cage press or a cocoa press, a screw press is preferred. A screw press permits the peanuts to be pressed to between 5–15% residual oil, with 5–10% being preferable, and 8–10% being more preferable. It is also preferred that the expelling device be a continuous type. The method of producing the peanut butter can then be performed as a continuous process.

The next step entails pressing the conditioned peanuts in the heated expelling device so that low-fat solid peanut cake and oil are separated from the conditioned peanuts. This process produces less heat damage than would occur if the peanuts were fully cooked first and then screw-pressed, as is current commercial practice for oil recovery. The peanut cake produced has very little, if any, color change, no off flavors, does not undergo browning from the typical Maillard browning reaction of roasting and has excellent protein quality. The solid peanut cake is of acceptable food grade quality. In addition, since no solvents are needed for this process, the resulting peanut cake has no solvent residue. The unroasted, processed, pressed cake has a pleasant, slightly starchy flavor, without the green, beany flavor associated with raw peanuts. If the recommended peanut moisture content is adhered to, the maximum amount of oil extraction will occur, and the best flavor and highest quality peanut cake will be obtained.

The next step involves reducing the particle size of the peanut cake by grinding to a particle size of 0.5 mm to 15 mm, preferably 5 mm to 10 mm. This grinding step can be accomplished in a Fitz Mill, Hammer Mill, Tornado Mill, or similar device.

The next step involves roasting the ground peanut cake for 1 to 6 minutes at a temperature of between approximately 200° to 260° C. The preferred range is 225°–245° C. Roasting is desired both to develop the peanut flavor and to improve processing quality through moisture loss. Roasting can be accomplished using a fluid bed roaster, commercial dry roaster, tray drier, or similar device depending upon the particle size to be roasted.

Roasting the protein cake creates a roasted peanut flavor and aroma that becomes more intense as the roast is darkened. Raw and "beany" off-flavors are completely absent in the roasted peanut cake.

The next step in the method is grinding the roasted peanut cake to a size of less than or equal to 1000 microns to produce a peanut flour. It is preferred to grind the peanut cake to less than 800 microns. Particle size reduction to a flour consistency after roasting the peanut cake is preferred to improve mouthfeel and aid in subsequent peanut butter processing steps. Importantly, the particle size of the flour is not critical to the subsequent process. Size reduction can be accomplished using a commercial Pin Mill, Bauer Mill, Fitz Mill, Tornado Mill, or equipment of similar design.

The peanut flour made by the discussed preferred method has advantages over other peanut flours. That is, peanuts of 5–6% moisture, when processed in accordance with this invention, produce a lower average oil content—between 5–15%—compared to other peanut flours.

The next step in the method of producing the peanut paste entails using a second amount of peanuts that have been roasted. Preferably, roasting of this second amount of peanuts occurs at a temperature between 160°–170° C. for 14 to 18 minutes. However, the second amount of peanuts can be roasted to any desired roast level using commercially available techniques. The second amount of peanuts can be blanched as desired. The preferred moisture content is 0.75–2.5%, more preferably 1.0–1.75%.

Using this roasted second amount of peanuts, the method then entails reducing the size of these peanuts. Preferably, the second amount of peanuts is milled so that approximately one half thereof has a size of less than or equal to 50 microns and the largest particles have a size of less than or equal to 750 microns. The reducing of the size, or grinding, can be accomplished in any grinder/comminuator, such as a Bauer Mill or similar device.

Figure 1:
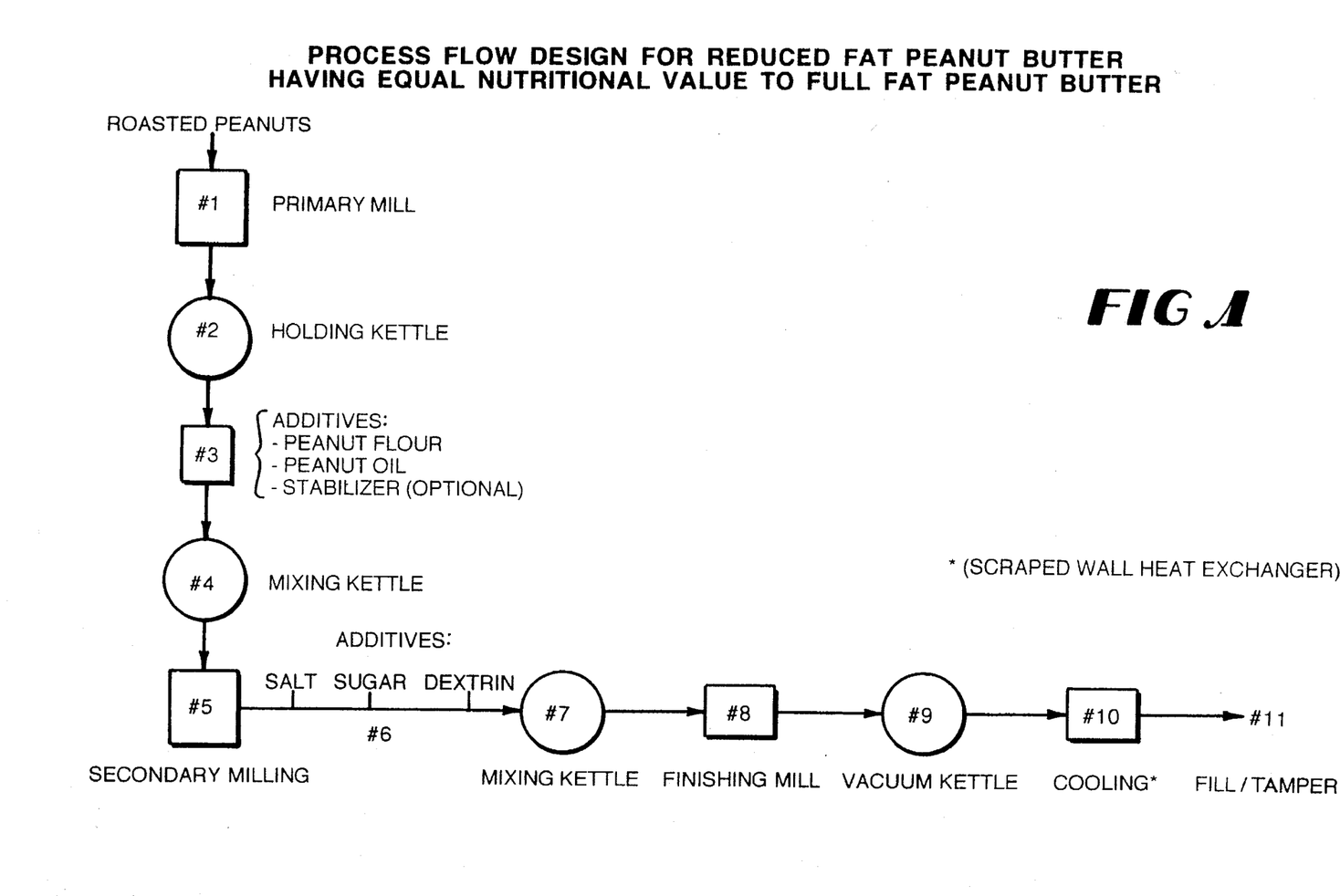
FIG. 1 is a schematic of the method of making reduced fat peanut butter in accordance with the present invention.

As shown in FIG. 1, the step of grinding the second amount of peanuts that have been roasted is illustrated as step number 1, labelled "Primary Mill." The next step, "Holding Kettle," provides a surge volume for the ground roasted peanuts. The holding time in the primary mill step is approximately less than one minute, whereas the holding time in the holding kettle is up to 25 minutes. The exit temperature of the ground peanuts leaving the primary mill is preferably 49°–71° C., more preferably 54°–66° C. It is preferred that this same temperature range be used for the ground peanuts exiting the holding kettle.

The method of producing a peanut paste then entails mixing the peanut flour, described earlier, and peanut oil in an amount of 0 to 10 percent by total weight, with the ground peanuts. Preferably, the ground peanuts are at a temperature of between 54°–66° C. This temperature can be maintained by energy held within peanuts or by external heating. The mixture of these ingredients produces a peanut slurry. The adding step, as shown as step number 3 in FIG. 1, preferably can be performed in a mixing trough. The mixing step is illustrated as step number 4, labelled "Mixing Kettle." The holding time in the trough for the mixing preferably is less than 1 minute and the holding time in the mixing kettle is up to 15 minutes. The exit temperature of product leaving the trough after mixing is in the range of 46°–63° C., and preferably in the range of 52°–57° C. The temperature decreases because the additives, e.g., peanut flour and peanut oil, can be at room temperature.

The peanut oil that is added allows the peanut flour and the second amount of ground roasted peanuts to become thoroughly "wet" and the mixture sufficiently fluid. The peanut oil provides a means to reduce the viscosity of the peanut slurry for further processing. The product at this point has a texture similar to bread dough. In an alternative embodiment, the peanut oil could be added earlier, such as in step number 1 shown in FIG. 1.

A stabilizer, an optional ingredient, can also be added to the other ingredients at this stage. This is shown in FIG. 1 at step number 3. Stabilizers are used to prevent oil separation. Types of stabilizers are hydrogenated cottonseed, rapeseed or palm oil or mixtures thereof. The amount of stabilizer added is from zero percent for old fashioned peanut butter to 3.0 percent.

The step of milling the peanut slurry is then performed to obtain the peanut paste. This is shown as step number 5 in FIG. 1, labelled as "Secondary Milling." This milling can reduce the size of the particles and liberate more oil. The holding time is preferably less than 1 minute and the exit temperature is in the range 71°–93° C., more preferably 79°–85° C. A mill such as an Urschel Mill, Roll Mill, Homogenizer, or similar device can be used. An Urschel Mill, Model 1700, which is equipped with a 206-1° milling head for optimum flow rate and grinding to the optimum particle size, is preferred. The optimum particle size is at least one half of the particles being less than or equal to 50 microns and the largest particles having a size of less than or equal to 250 microns.

The peanut paste can have an oil content of about 40%, non-fat peanut solids of 55%, and a protein content of 33%, all from natural peanut components. This primary peanut paste is the basis for developing the reduced fat peanut butter equal in peanut solids, protein, and nutritional quality to standard peanut butter.

The first step in producing the peanut butter from the peanut paste is adding effective amounts of ingredients such as salt, sweeteners, dextrins, corn syrup solids, dextrose, flavorants, and/or fiber with the peanut paste. This combination produces a peanut product. After this adding step, the method then involves blending the peanut product. The types of machines that can be used for blending are ribbon blender, in-line high shear mixer, high shear kettle mixer, or similar device. These steps are shown in FIG. 1 as step numbers 6 and 7 respectively. The adding step can be performed in less than 1 minute and the exit temperature preferably can be 66°–88° C., more preferably 74°–79° C. The blending step preferably can be performed in up to 10 minutes and it preferably would have no change in the range of exit temperature from the adding step.

Then, the next step is remilling the peanut product, wherein a reduced fat peanut butter is produced. This step is shown as step number 8 in FIG. 1, labelled "Finishing Mill." This finishing mill step can further reduce the size of the particles and liberate more oil. However, the optimum particle size remains the same as the effluent of the milling step illustrated as step number 5 in FIG. 1. That is, at least one half of the particles can be less than or equal to 50 microns and the largest particles can have a size of less than or equal to 250 microns. A mill, such as an Urschel Mill, Roll Mill, Homogenizer, or similar device, can be utilized in this step. This step can be performed in less than 1 minute, and the exit temperature preferably can be in the range 71°–93° C., more preferably 79°–85° C.

Addressing the specific ingredients that can be added to make the reduced fat peanut butter, there can be many variations. The Examples discussed below illustrate a few of these. Salt can be added if desired. The range that salt can be added is zero–2.0%, more preferably in an amount of 0.5–1.5%. In an alternative embodiment, salt can be added in the mixing step in making the peanut paste, shown as step number 3 in FIG. 1.

Other ingredient that can be added are dextrin or corn syrup solids. The range of maltodextrin or corn syrup solids that can be added is 0–22.0%, more preferably in an amount of 10–15%.

There are many types of sweeteners available. Examples are powdered sugar, dehydrated honey, liquid honey, sucrose, corn syrup, crystalline fructose, dextrose, high fructose corn syrup, or similar products. The range of these products added depends on the sweetness desired in a range from zero to 22 percent.

Flavorants may also be added to the reduced fat peanut butter. Flavoring that have been prepared with the reduced fat formulation are identified as follows:

| TYPE | SUPPLIER |
| --- | --- |
| Cheddar Cheese | Mid America Farms #3536 |
| Nacho Cheese | Heller #BR2066 |
| Smoke Flavored | Baltimore Spice #SN38213 |
| Maple Flavored | Mother Murphy's #7202 |
| Banana | Mother Murphy's #378 |
| Cocoa Powder | Ed & F Man 10/12 Alralized |

The preferred range for adding these flavorants is in an amount of approximately 0.1 to 5 percent by total weight.

Fiber components, single or in combination, can also be added to the reduced fat peanut butter. The fiber source can be utilized to provide a higher fiber contribution per serving size, while reducing the fat. Appropriate fiber sources include corn, psyllium, rice, peanut, wheat, soy, citrus, and pectins. Guar and locust bean gums are also fiber sources that can be used in part or totally to replace the cereal type fiber. If fibers are used, the desired range is from 1–12 percent, singly, or in combination.

The reduced fat peanut butter can then be finished using conventional processing techniques. The first step entails deaerating the peanut butter for between 2 to 8 minutes, preferably for 5 minutes, in a vacuum kettle at 15 to 30 inches of vacuum, and more preferably at 25 inches of vacuum. The peanut butter can be deaerated in a conventional vacuum kettle to remove residual air. This air removal produces a more shelf stable, creamier peanut butter product. This step is shown in FIG. 1 as step number 9.

The next step in finishing the peanut butter is rapidly cooling the deaerated peanut butter. This rapid cooling crystallizes the stabilizer. In the peanut butter products that do not use the optional stabilizer, this step can still be performed to increase the shelf life of the peanut butter. The preferred range to cool the reduced fat peanut butter to is 29°–46° C., and more preferably to 32°–38° C. This step, as shown in FIG. 1 as step number 10, may be performed using a conventional scraped wall heat exchanger. It can be performed in less than 1 to 5 minutes.

After the cooling step, there is an optional step of adding an effective amount of nut chunks of a size of 900 to 5000 microns to the peanut butter. This additional step is used to make chunky peanut butter. Nut chunks that can be used include the following: full fat peanut chunks, partially defatted peanut chunks, honey toasted partially defatted peanut granules, honey toasted peanut granules, or similar products. In an alternative method, nut chunks, such as partially defatted peanut chunks, can be added to the peanut paste at step number 6 in FIG. 1. The amount of nut chunks that can be added is approximately 5–15 percent by total weight.

The next step is filling in desired containers and tempering the peanut butter for at least 24 hours at an atmospheric temperature between 20° to 35° C. This step provides an oil stable, spreadable end product. This is illustrated in FIG. 1 as step number 11.

Figure 2:
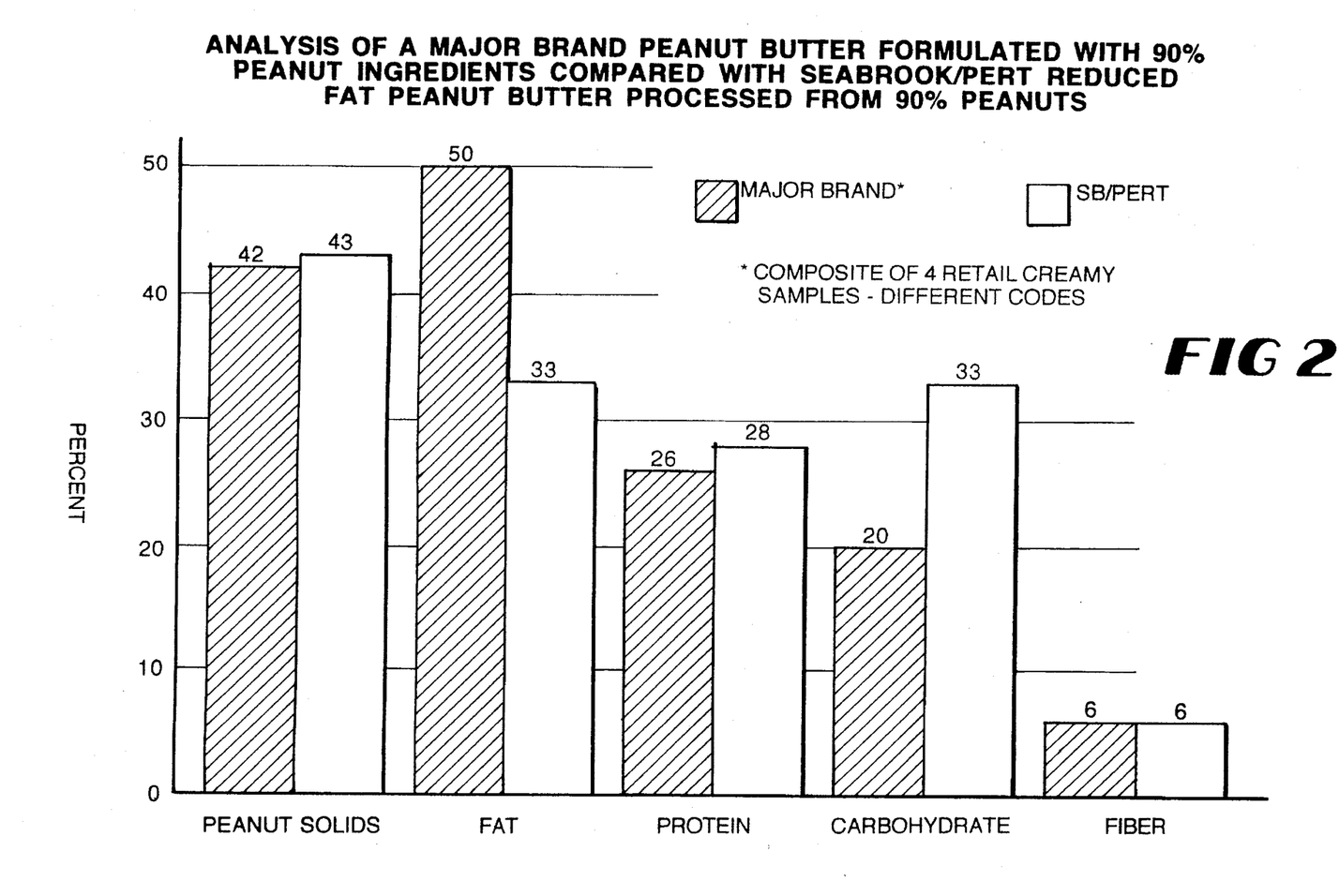
FIGS. 2–4 are a graphical presentation of analytical data comparing reduced fat peanut butter of the present invention with commercially-available peanut butter.

Analytical data comparing the new reduced fat product with retail samples of a major brand peanut butter for the proximate analysis content are shown in FIG. 2. It confirms the peanut solids of the product of the present invention to be equal, the protein and fiber to be equivalent, and a significant reduction in the fat content. The carbohydrates in the reduced fat peanut butter replace most of the fat.

Figure 3:
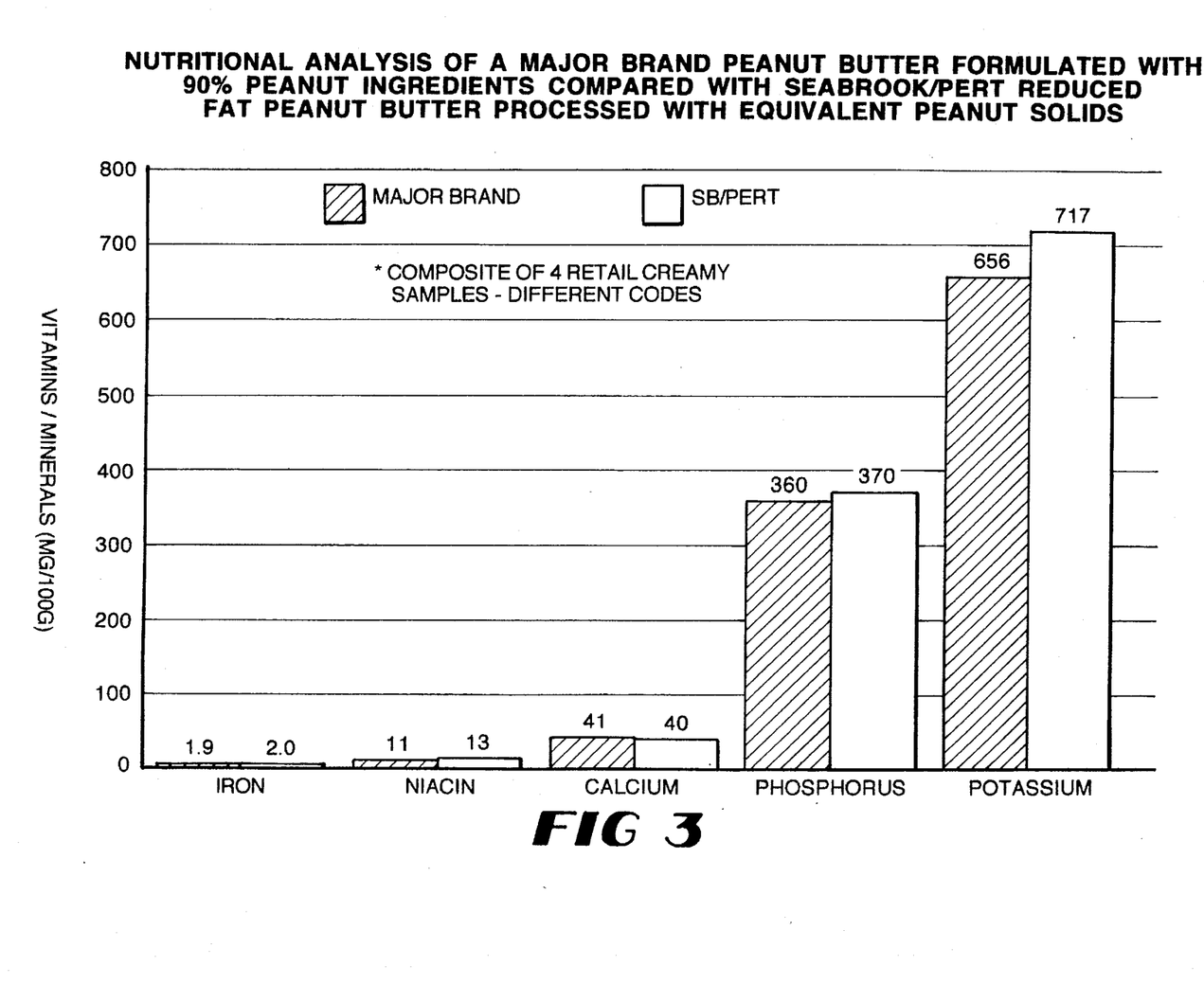

Since the vitamins and minerals are contributed from the peanut solids, FIG. 3 summarizes an analysis of the reduced fat with the major brand. It also confirms that the nutrient component of both products are the same.

Figure 4A:
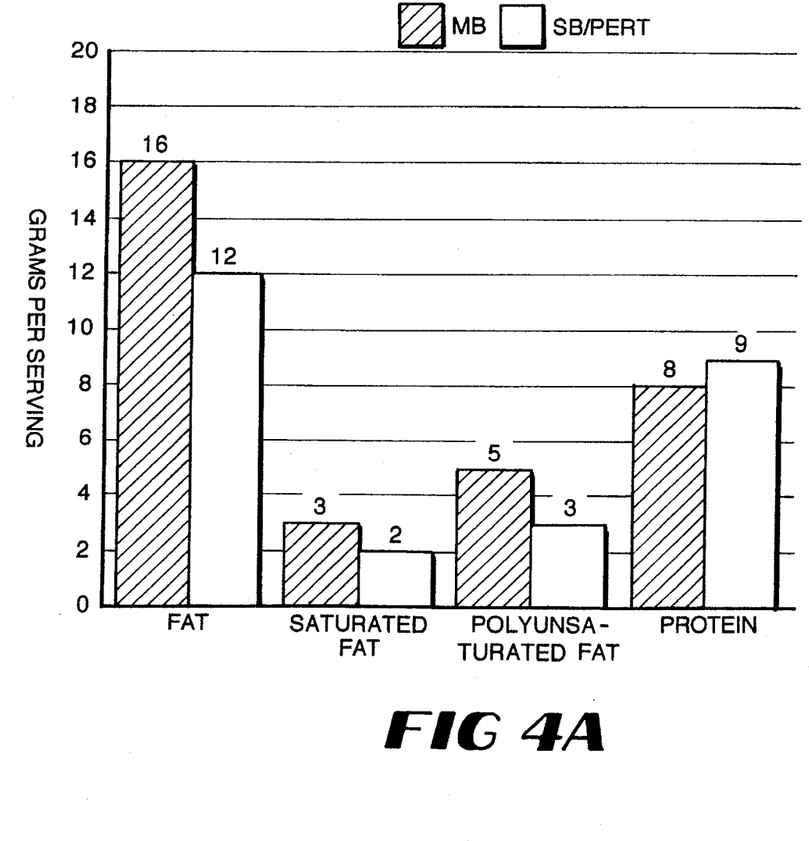
Figure 4B:
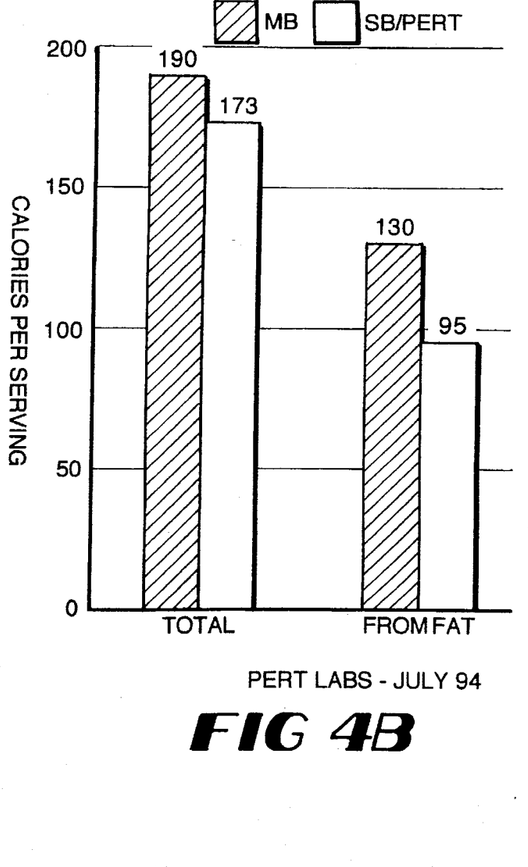

FIG. 4 provides data on the serving size for each product confirming the fat reduction of the new, reduced fat product is equal in nutritional value with a 25% reduction in fat intake.

ExampleS

The following examples are provided for illustrative purposes and are not to be interpreted as limiting the scope of the invention.

Example I

Stabilized Reduced Fat Peanut Butter

An example of a reduced fat peanut butter that has 25% less fat per serving and has all the properties of standard peanut butter, including consistency, flavor, color, texture and equivalency in nutritional quality is shown below.

| Ingredients | % |
| --- | --- |
| Ground Roasted Peanuts | 50.00 |
| High Protein Peanut Flour | 24.00 |
| Peanut Oil | 5.00 |
| Stabilizer | 1.00 |
| Maltodextrin | 11.60 |
| Powdered (6X) Sugar | 7.00 |
| Salt | 1.40 |

Analyzing the above product formula, it shows that the peanut paste provides all of the peanut ingredients—including oil—and comprises 80% of the total product. Since roasted peanuts are normally 50% oil, by weight, and the high protein peanut flour is 10% oil, the total oil content can be calculated as follows:

| Peanuts | ($50/100 \times 50\%$) | = | 25.0% |
| --- | --- | --- | --- |
| Flour | ($24/100 \times 10\%$) | = | 2.4% |
| Peanut Oil | ($5/100 \times 100\%$) | = | 5.0% |
| Stabilizer | ($1/100 \times 100\%$) | = | 1.0% |
| Total Oil In Product | | = | 33.4% |

The peanut paste can have an oil content of 40–42% to provide an end product with an oil content which is 25% reduced on a serving size basis. The ingredients of the peanut paste can be changed in any combination due to minor variations of the oil content of the peanuts and flour as long as the combination of all ingredients does not exceed an oil content of 43–44%. For example, a peanut paste mixture of 36% roasted full fat peanuts, 30% high protein peanut flour, 10% peanut oil, and 1% stabilizer also provides a peanut paste oil content of 40%.

Example II

A Stabilized Chunky Style Reduced Fat Peanut Butter

A chunky style product with reduced fat is produced by replacing part of the ground roasted peanuts with 8–10% of a roasted peanut granule, prepared by hydraulic pressing of blanched peanuts, as in U.S. Pat. No. 3,294,549, to about 30% oil by weight, roasting the partially defatted peanuts to the desired color, and granulating and screening to approximately the following particle size:

| Sieve | % |
| --- | --- |
| #4 | 15–19 |
| #6 | 63–67 |
| 8 | 13–17 |
| 10 | 1–4 |
| −10 | <2 |

An example of a final formula for such a reduced fat product is:

| INGREDIENT | % |
| --- | --- |
| Ground Roasted Peanuts (oil at 50% by weight) | 40.0 |
| Partially Defatted Granules (oil at 30% by weight) | 10.0 |
| High Protein Peanut Flour (oil at 10% by weight) | 24.0 |
| Peanut Oil | 5.0 |
| Stabilizer | 1.0 |
| Maltodextrin | 11.6 |
| Sugar 6X | 7.0 |
| Salt | 1.4 |

Final oil content of this peanut butter is 31.4% by weight.

Unique variations of chunk granules can replace the partially defatted peanut granules to obtain various textural effects and eating quality. Examples are honey toasted peanut granules (Canada Patent No. 1,184,063, dated Mar. 19, 1985), sugar coated granules, and regular full fat peanut granules. Using those granules, adjustments can be made in the quantity of peanuts and peanut flour to obtain the desired oil content.

Example III

Old Fashioned Style Reduced Fat Peanut Butter

An old fashioned, unstabilized reduced fat (25%) peanut butter can be prepared by omitting the stabilizer, adjusting the peanut oil to compensate for the loss of the stabilizer fat component, replacing sugar with maltodextrin, and using a fine, semi-coarse or coarse grind. Such a peanut butter can have the following formula:

| INGREDIENT | % |
| --- | --- |
| Ground Roasted Peanuts | 50 |
| High Protein Peanut Flour | 24 |
| Peanut Oil | 5 |
| Maltodextrin | 19.5 |
| Salt | 1.5 |

To achieve the desired sweetness, the maltodextrin or corn syrup solids can have a higher dextrose equivalent(DE) to increase the sweetness level, or a combination with sugar can be added.

A honey flavored, old fashioned style reduced fat peanut butter can be made by replacing a portion of the maltodextrin with powdered or liquid honey.

Example IV

Reduced fat peanut butters with supplemental flavors can also be made. For example, a honey flavored peanut butter with 25% less fat can be made using honey, either liquid or dehydrated, as a total or partial replacement of the sugar or maltodextrin.

| INGREDIENT | % |
|---|---|
| Ground Roasted Peanuts | 50.0 |
| High Protein Peanut Flour | 24.0 |
| Peanut Oil | 5.0 |
| Maltodextrin | 10.5 |
| Dehydrated Honey | 9.0 |
| Salt | 1.5 |

Example IV can be made in either creamy or chunky style, stabilized or unstabilized, with full fat or the partially defatted peanut chunks replacing part of the ground roasted peanuts at an amount of 6–12% by total weight.

Example V

Reduced Fat Peanut Butter With 30% Fat Reduction

It has also been determined that using the present invention, a product with a 30% fat reduction can be made that retains viscosity and flow properties consistent with conventional peanut butter production.

| INGREDIENT | % |
|---|---|
| Roasted Peanut @ 51% Oil | 44.3 |
| High Protein Flour @ 11% Oil | 28.8 |
| Peanut Oil | 4.8 |
| Stabilizer | 1.2 |
| Salt | 1.3 |
| Maltodextrin | 12.1 |
| Sugar (6X) | 7.5 |

The above example provides a peanut butter with a fat content sufficient to reduce the fat per serving by 30% compared to regular peanut butter at 50% fat, or 16 grams, for each 32 grams serving.

Example VI

Reduced Fat Peanut Butter Obtained By Partial Pressing of the White, Blanched Peanuts, Then Roasting to the Desired Color Another reduced fat peanut butter having a 30% fat reduction can be made by first blanching the second amount of peanuts and then pressing the blanched peanuts using a cage press, such as an Albright-Nell having a capacity of 440 pounds, to a fat content of 43–44 percent on a wet basis. Roasting these pressed peanuts produces a roasted nut, having a fat content of about 45% considering the moisture loss (about 5%) from the roasting process.

A peanut butter with 30% fat reduction can be attained using these roasted, pressed peanuts that has excellent flavor, aroma, and textural characteristics.

| INGREDIENT | % |
|---|---|
| Ground, Roasted Peanuts Adjusted to 45% Oil Roasted Basis | 50.00 |
| High Protein Peanut Flour @ 11% Oil | 24.00 |
| Peanut Oil | 5.00 |
| Stabilizer | 1.00 |
| Maltodextrin | 11.60 |
| Powdered Sugar (6X) | 7.00 |
| Salt | 1.40 |

This peanut butter produces a product of about 31% total fat on a weight basis.

Example VII

Further improving the nutritional value of the reduced fat product, a formulation exists in which part of the fat can be replaced with fiber to improve the fiber content. An example of this product is shown below, which contains a combination of oat fiber, beet fiber and methylcellulose.

| INGREDIENT | % |
|---|---|
| Peanuts | 50.0 |
| High Protein Flour | 24.0 |
| Peanut Oil | 5.0 |
| Stabilizer | 1.0 |
| Sugar (6X) | 8.0 |
| Oat Fiber | 4.0 |
| Beet Fiber | 4.0 |
| Methylcellulose | 4.0 |

Although the present process has been described with reference to specific details of certain embodiments thereof, it is not intended that such details should be regarded as limitations upon the scope of the invention except as and to the extent that they are included in the accompanying claims.

What is claimed is:

1. A method for producing a peanut paste for use in making peanut butter, comprising the steps of:
   (a) selecting a first amount of uncooked peanuts at a predetermined moisture level;
   (b) conditioning the first amount of peanuts by heating them for not more than approximately two minutes so that the peanuts reach a final temperature of between 71°–99° C.;
   (c) preheating an expelling device to a temperature of between 107°–132° C.;
   (d) pressing the conditioned peanuts in the heated expelling device so that low-fat solid peanut cake and oil are separated;
   (e) decreasing the size of the peanut cake particles to a size of less than 15 millimeters;
   (f) roasting the peanut cake for 1 to 6 minutes at a temperature of between 200°–260° C.;
   (g) grinding the roasted peanut cake to a size of less than or equal to 1000 microns to produce a peanut flour;
   (h) reducing the size of a second amount of peanuts that have been roasted, wherein approximately one half of the second amount of peanuts has a size of less than or equal to 50 microns and the largest particles have a size of less than or equal to 750 microns;

(i) mixing the peanut flour with the second amount of peanuts and peanut oil in an amount of 0 to 10 percent by total weight while the second amount of peanuts and peanut oil are at a temperature of between 54°–66° C. to produce a peanut slurry; and (j) milling the peanut slurry so that at least one half of the particles have a size of less than or equal to 50 microns and the largest particles have a size of less than or equal to 250 microns, wherein a peanut paste is produced.

2. The method of claim 1, further comprising, after the milling step, the step of making reduced fat peanut butter by (a) adding effective amounts of sweetener and dextrin with the peanut paste to produce a peanut product;

(b) blending the peanut product; and (c) remilling the peanut product, wherein a reduced-fat peanut butter is produced.

3. The method of claim 2, further comprising, after the remilling step, the step of finishing the peanut butter by (a) deaerating for between 2 to 8 minutes the peanut butter in a vacuum kettle between 15 to 30 inches of vacuum;

(b) rapidly cooling the deaerated peanut butter to increase shelf-life;

(c) filling the peanut butter into the desired container; and (d) tempering the peanut butter for at least 24 hours at an atmospheric temperature between 20° to 35° C.

4. The method of claim 3, further comprising, after the cooling step, adding an effective amount of nut chunks of a size of 900 to 5000 microns to the peanut butter.

5. The method of claim 2, further comprising, concurrent with the adding step, the step of adding to the ground peanut paste an effective amount of salt.

6. The method of claim 5, wherein the peanut butter, by weight, is approximately 50 percent ground roasted peanuts, 24 percent peanut flour, 5 percent peanut oil, 19.5 percent maltodextrin, and 1.5 percent salt.

7. The method of claim 5, wherein the peanut butter, by weight, is approximately 50 percent ground roasted peanuts, 24 percent peanut flour, 5 percent peanut oil, 10.5 percent maltodextrin, 9 percent dehydrated honey, and 1.5 percent salt.

8. The method of claim 2, further comprising, concurrent with the adding step, the step of adding cheddar cheese flavoring, nacho cheese flavoring, smoke flavor, maple flavor, banana, or cocoa powder to the ground peanut slurry in an amount of approximately 0.5 to 5 percent by total weight.

9. The method of claim 2, wherein the formulated reduced fat peanut butter has an oil content that does not exceed 35 percent.

10. The method of claim 1, wherein the peanut flour has an oil content of up to 15 percent.

11. The method of claim 1, wherein the peanut paste has an oil content of up to 44 percent.

12. The method of claim 1, further comprising, concurrent with the mixing step, the step of adding an effective amount of a stabilizer.

13. The method of claim 12, further comprising, after the milling step, the step of making reduced fat peanut butter by (a) adding effective amounts of sweetener and fiber with the peanut paste to produce a peanut product;

(b) blending the peanut product; and (c) remilling the peanut product, wherein a reduced-fat peanut butter is produced.

14. The method of claim 13, further comprising, after the remilling step, the step of finishing the peanut butter by (a) deaerating for between 2 to 8 minutes the peanut butter in a vacuum kettle at 25 inches of vacuum;

(b) rapidly cooling the deaerated peanut butter to crystallize the stabilizer;

(c) filling the peanut butter into the desired container; and (d) tempering the peanut butter for at least 24 hours at an atmospheric temperature between 20° to 35° C.

15. The method of claim 14, further comprising, after the cooling step, adding an effective amount of nut chunks of a size of 900 to 5000 microns to the peanut butter.

16. The method of claim 14, wherein the formulated reduced fat peanut butter has an oil content that does not exceed 35 percent.

17. The method of claim 13, wherein the peanut butter is approximately 50 percent ground roasted peanuts, 24 percent peanut flour, 5 percent peanut oil, 1 percent stabilizer, 8 percent powdered sugar, 4 percent oat fiber, 4 percent beet fiber, and 4 percent methycellulose.

18. The method of claim 12, further comprising, after the milling step, the step of making reduced fat peanut butter by (a) adding effective amounts of sweetener and dextrin with the peanut paste to produce a peanut product;

(b) blending the peanut product; and (c) remilling the peanut product, wherein a reduced-fat peanut butter is produced.

19. The method of claim 18, further comprising, after the milling step, the step of finishing the peanut butter by (a) deaerating for between 2 to 8 minutes the peanut butter in a vacuum kettle between 15 to 30 inches of vacuum;

(b) rapidly cooling the deaerated peanut butter to crystallize the stabilizer;

(c) filling the peanut butter into the desired container; and (d) tempering the peanut butter for at least 24 hours at an atmospheric temperature between 20° to 35° C.

20. The method of claim 19, further comprising, after the cooling step, adding an effective amount of nut chunks of a size of 900 to 5000 microns to the peanut butter.

21. The method of claim 18, further comprising, concurrent with the adding step, the step of adding to the ground peanut paste an effective amount of salt.

22. The method of claim 21, wherein the peanut butter, by weight, is approximately 50 percent ground roasted peanuts, 24 percent peanut flour, 5 percent peanut oil, 1 percent stabilizer, 11.6 percent maltodextrin, 7 percent powdered sugar, and 1.4 percent salt.

23. The method of claim 21, after the remilling step, the step of simultaneously adding and mixing partially defatted peanut granules having a size of 900 to 5000 microns to the reduced fat peanut butter in an amount of approximately 5–15 percent by total weight.

24. The method of claim 23, wherein the peanut butter, by weight, is approximately 40 percent ground roasted peanuts, 10 percent roasted partially defatted peanut granules, 24 percent peanut flour, 5 percent peanut oil, 1 percent stabilizer, 11.6 percent maltodextrin, 7 percent powdered sugar, and 1.4 percent salt.

25. The method of claim 23, wherein the peanut granules are honey toasted partially defatted peanut granules.

26. The method of claim 21, wherein the peanut butter, by weight, is approximately 44.3 percent ground roasted peanuts having an oil content of approximately 51 percent, 28.8 percent peanut flour having an oil content of approximately 11 percent, 4.8 percent peanut oil, 1.2 percent stabilizer, 12.1 percent maltodextrin, 7.5 percent powdered sugar, and 1.3 percent salt.

27. The method of claim 21, wherein the peanut butter, by weight, is approximately 50 percent ground roasted peanuts having an oil content of approximately 45 percent, 24 percent peanut flour having an oil content of approximately 11 percent, 5 percent peanut oil, 1 percent stabilizer, 11.6 percent maltodextrin, 7 percent powdered sugar, and 1.4 percent salt.

28. The method of claim 18, further comprising, concurrent with the adding step, the step of adding cheddar cheese flavoring, nacho cheese flavoring, smoke flavor, maple flavor, banana, or cocoa powder to the ground peanut slurry in an amount of approximately 0.1 to 5 percent by total weight.

29. The method of claim 18, wherein the formulated reduced fat peanut butter has an oil content that does not exceed 35 percent.

\* \* \* \* \*